US00RE43150E

(19) United States
(12) Reissued Patent
Maurinus et al.

(10) Patent Number: US RE43,150 E
(45) Date of Reissued Patent: Jan. 31, 2012

(54) ELECTRONIC PHOTOGRAPHY SYSTEM

(75) Inventors: Martin Arthur Maurinus, Rochester, NY (US); Wilbert F. Janson, Jr., Shortsville, NY (US)

(73) Assignee: Eastman Kodak Company, Rochester, NY (US)

(21) Appl. No.: 11/807,348

(22) Filed: May 25, 2007

Related U.S. Patent Documents

Reissue of:
(64) Patent No.: 6,222,646
Issued: Apr. 24, 2001
Appl. No.: 08/584,501
Filed: Jan. 11, 1996

(51) Int. Cl.
*H04N 1/40* (2006.01)

(52) U.S. Cl. ..... 358/440; 358/1.9; 358/1.15; 358/527; 396/429

(58) Field of Classification Search ..... 358/1.9, 358/2.1, 1.15, 440, 527, 407–408, 400–402
See application file for complete search history.

(56) References Cited

U.S. PATENT DOCUMENTS 4,700,230 A 10/1987 Pshtissky et al.
4,959,670 A 9/1990 Thayer et al.
5,027,104 A 6/1991 Reid
5,206,732 A 4/1993 Hudson
5,264,929 A 11/1993 Yamaguchi
5,291,302 A 3/1994 Gordon et al.
5,309,257 A 5/1994 Bonino et al.
5,327,265 A 7/1994 McDonald
5,349,452 A 9/1994 Maeda et al.
5,485,554 A 1/1996 Lowitz et al. ..... 395/116
5,576,838 A 11/1996 Renie ..... 386/117
5,655,053 A 8/1997 Renie ..... 386/117

*Primary Examiner* — Thomas D Lee
*Assistant Examiner* — Stephen M Brinich
(74) *Attorney, Agent, or Firm* — Frank Pincelli; Eugene I. Shkurko

(57) ABSTRACT

A system for electronic photography includes a number of photo-capture stations. Each station includes a digital camera and a customer identification device for selectively actuating the digital camera to capture a digital image and recording customer identification with the digital image. The system includes a central controller for collecting and storing the digital images captured by the photo-capture stations and a high bandwidth communications network connecting the photo-capture stations to the central controller. The system also includes an output station connected to the central controller by the high bandwidth communications network. The output station has a customer identification device, a display device responsive to actuation of the customer identification device to display the digital images associated with the customer identification, an output device for transferring the digital images to an output medium, and a customer interface to allow the, customer to select images to be transferred to the output medium.

11 Claims, 2 Drawing Sheets

ELECTRONIC PHOTOGRAPHY SYSTEM

Matter enclosed in heavy brackets [ ] appears in the original patent but forms no part of this reissue specification; matter printed in italics indicates the additions made by reissue.

*This application is a reissue application For U.S. Pat. No. 6,222,646 issued on Apr. 24, 2001 on U.S. Ser. No. 08/584,501 filed Jan. 11, 1996*

FIELD OF THE INVENTION

The invention relates generally to the field of electronic photography, and in particular to commercial electronic photography systems.

BACKGROUND OF THE INVENTION

It is known to provide an electronic photography system in theme parks for capturing images of customers participating in rides or events in the theme park with a digital still camera, displaying the captured images on a CRT and producing a print of the images at the request of the customer. The images are displayed at the end of the ride or event and the print is produced at the ride location. Such a system is manufactured and sold as the High Speed Theme Capture System by the Eastman Kodak Company, Rochester N.Y. In a theme park or other public location such as a park or zoo, there may be many such locations were it would be desirable to capture an image of the customer. Providing an electronic photography system of the known type at each such location would be prohibitively expensive. In addition, it is inconvenient for the customer to carry around the print from one event site to another. It is also inconvenient for a customer to wait in line to receive the print after the ride or event. There is therefor a need for an improved electronic photography system that overcomes the shortcomings in the prior art.

SUMMARY OF THE INVENTION

The present invention is directed to overcoming one or more of the problems set forth above. Briefly summarized, according to one aspect of the present invention a system for electronic photography, includes a plurality of photo-capture stations, each station including a digital camera and a customer identification device for selectively actuating the digital camera to capture a digital image and recording customer identification with the digital image; a central controller for collecting and storing the digital images captured by the photo-capture stations; a high bandwidth communications network connecting the photo-capture stations to the central controller; an output station connected to the central controller by the high bandwidth communications network, the output station including a customer identification device, a display device responsive to actuation of the customer identification device to display the digital images associated with the customer identification, an output device for transferring the digital images to an output medium, and means for the customer to select images to be transferred to the output medium.

The electronic imaging system according to the present invention has the advantage that it reduces the number of output devices that are needed by providing a central output device that can be fed by a plurality of image capture devices.

Another advantage of the present system is that the output station may be located in a convenient location such as in a hotel adjacent the theme park or other public attraction. The present invention has a further advantage in that a plurality of images taken at different locations may be combined in a consistent output format such as an album or a compact disk.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
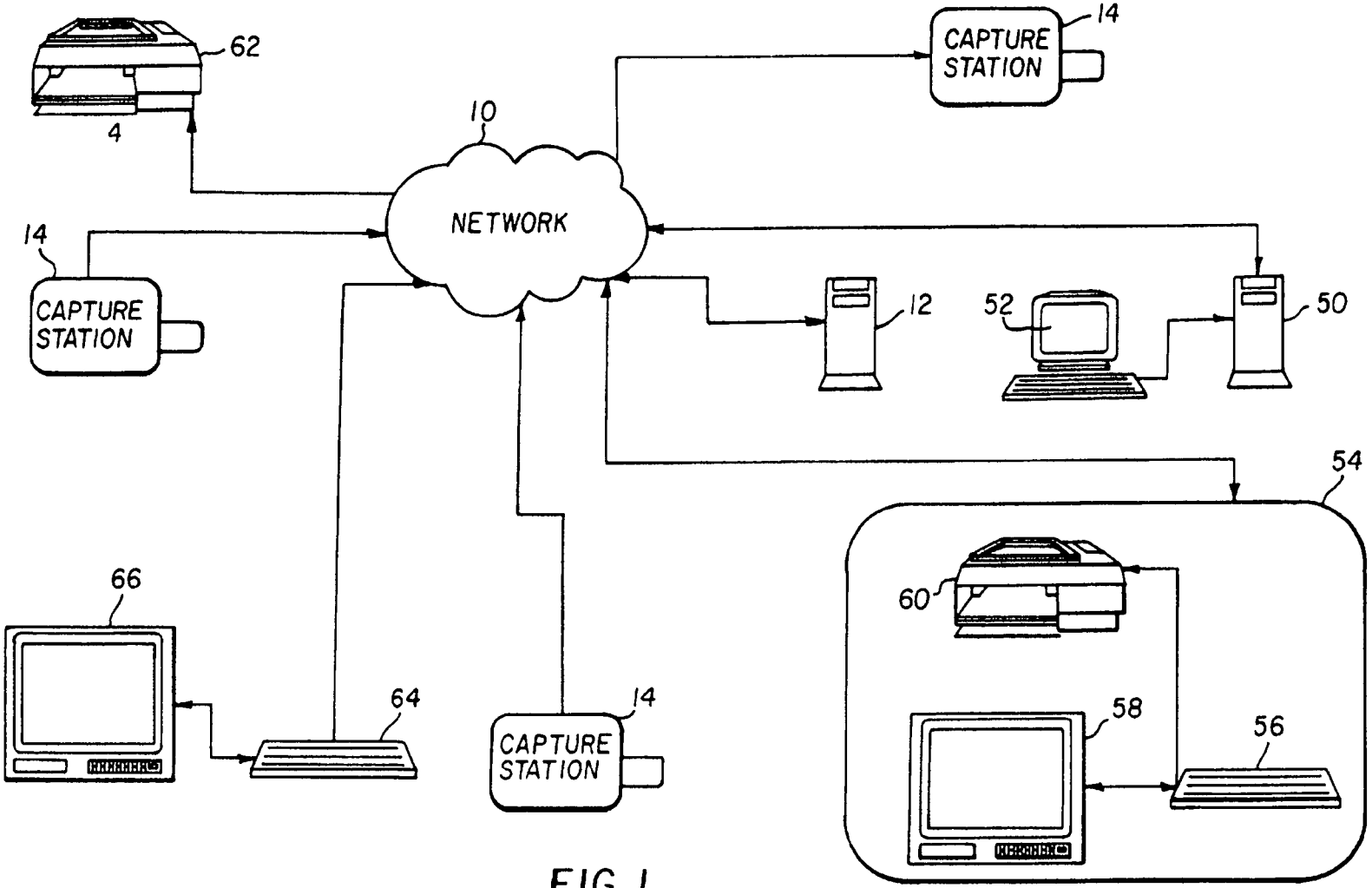
FIG. 1 is a schematic representation of the Electronic Photography System according to the present invention.

Referring to FIG. 1, an Electronic Photography System according to the present invention includes a high bandwidth network 10 such as a high speed Ethernet operating at 100 Mbs or a radio frequency communications network. Network communications are controlled by the network controller 12 such as a Sun Server available from Sun Microsystems, California, which maintains the flow of information over the network 10.

Figure 2:
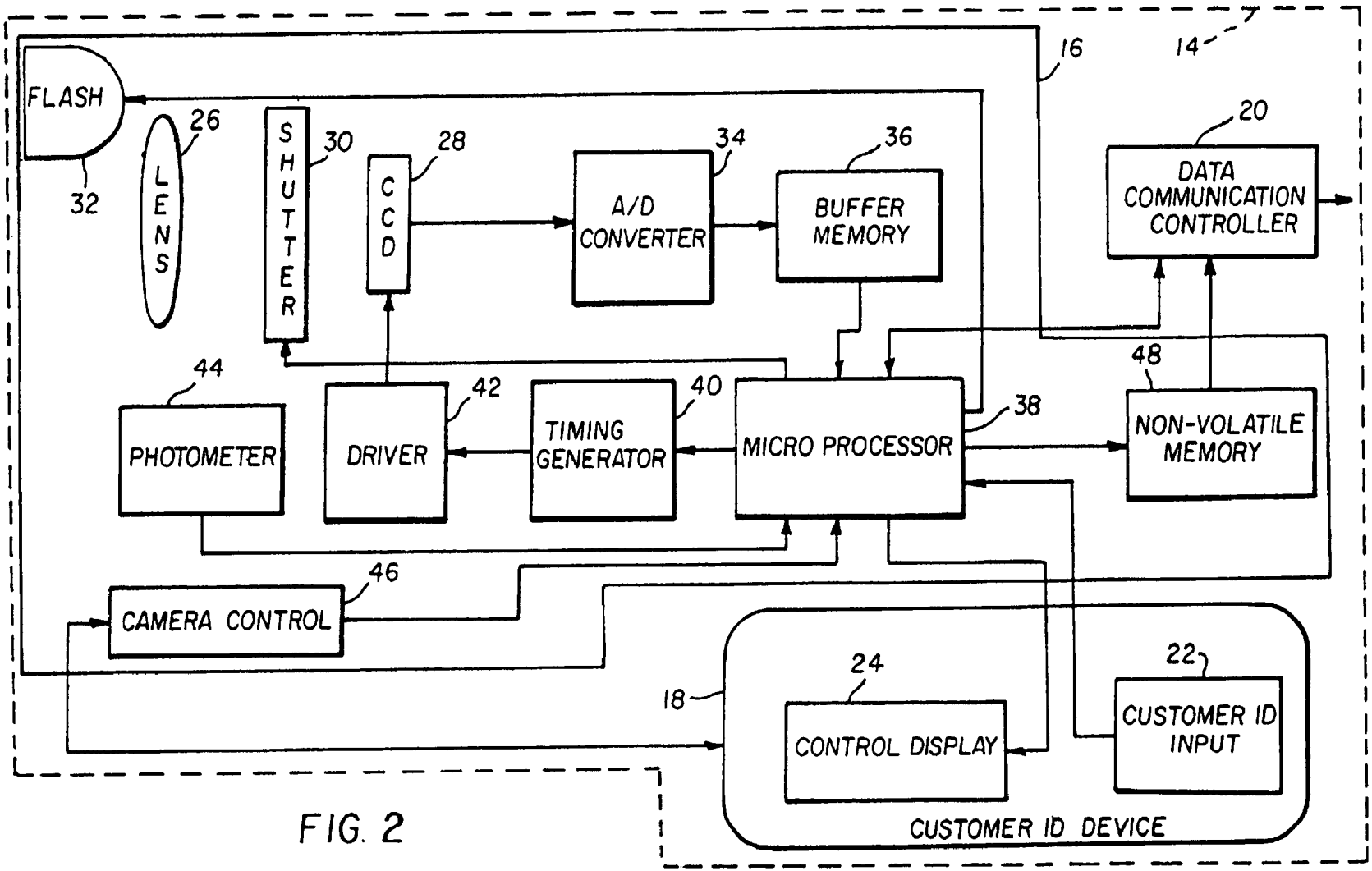
FIG. 2 is a schematic representation of the Photo Capture Station shown in FIG. 1.

A plurality of image capture stations 14 are located at scenes of interest and are connected to the network 10. FIG. 2 shows an image capture station 14 in more detail. The photo capture station 14 includes a digital camera 16 such as a Kodak DCS 420 digital camera; a customer identification device 18; and a communication controller 20.

The image capture stations 14 are not limited to fixed locations, and may be portable. In this case, the image capture station 14 would resemble a digital camera that is rented or loaned to the customer. The connection to the network 10 is achieved via a wireless communication transceiver associated with the camera, or a docking station that the camera may be connected to for downloading images temporarily stored in the camera to the network.

The customer identification device 18 includes a customer ID input device 22 such as a key board, magnetic card reader, etc. that is responsive to the entry by the customer of their unique identification. A control display 24, such as a CRT, displays instructions and image capture options to the customer. The control display 24 and the customer ID input 22 may be combined in a single touch screen display.

The digital camera 16 includes an objective lens 26 for forming an image of a scene on a solid state image sensor 28, such as a CCD image sensor. Exposure of the image sensor 28 is controlled by a shutter 30. A flash lamp 32, may be provided as an accessory for the digital camera 16, to supplement the scene illumination. The signal from the CCD image sensor 28 is supplied to an A/D converter 34 to form a digital image signal. The digital image signal is temporarily stored in a buffer memory 36. Overall control of the digital camera 16 is provided by a microprocessor 38. The microprocessor 38 controls a timing generator 40 that provides timing signals to a CCD driver 42 for driving the CCD image sensor 28 and is responsive to a photometer 44 for controlling the shutter 30 and flash lamp 32. A camera control module 46 connected to the micro processor 38 includes a shutter release and other controls for the operation of the camera. The shutter release may be actuated by the customer himself at a station where image may be composed and the camera aimed by the customer. Alternatively, the image capture station may be located at a mechanized attraction, such as a coaster, and the shutter release actuated automatically by the mechanism of the attraction, such as by a car passing the camera on the coaster ride. In this case the shutter may be actuated a number of times, for example to capture several segments of a train of cars. The micro processor 38 transfers the captured image(s) from buffer memory 36 to non volatile memory 48 such as a flash EPROM for transmission over the network by the data communication controller 20.

Upon entry of the customer identification, access to the use of the digital camera 16 by the customer is enabled. When the image capture station captures an image(s) by activating the camera control 46, the image is stored temporarily in non-volatile memory 48. When the image capture sequence is complete, or when a portable camera has access to the network, the microprocessor 38 causes the image(s) along with the customer identification to be transmitted over the network 10 to a central image processor 50 (see FIG. 1), via the data communication controller 20 in the capture station 14. In the case where the camera shutter 30 is actuated automatically by the ride, the identification numbers of all those customers on the ride who have entered their identification numbers will be associated with the image(s) captured on the ride, and they will all have access to the digital image(s) captured during the ride.

At the central image processor 50, a system administrator can edit the image for defects or enhance the image by adjusting color saturation, contrast or sharpness on an image editing workstation 52. The edited image is then stored in the central image processing controller 50. The central image processor 50 may also contain a number of stock images of the site, such as are popular on post cards sold at such sites, that the customer may view at an output station and select for inclusion with her personal images acquired at the image capture stations.

An image output station 54 connected to the network 10 and located at a convenient place such as a gift shop or hotel lobby includes, for example, a customer identification device 56, which is preferably similar to the customer ID input 22 in the image capture station 14. The image output station also includes a display and customer interface, such as a touch-screen CRT 58, for customer viewing, manipulation and selection of their stored images or stock images. The image output station also includes a hardcopy output device 60, such as a Kodak Colorease thermal printer for producing prints of selected customer images. The image output station may also include a digital image recording device for recording the digital images on magnetic or optical digital storage medium such as a floppy disc or a compact disc.

At the image output station 54, the customer enters their identification into the customer identification device 56, thereby allowing access to their stored images for review and further enhancement using output station display 58. The customer may then place an order for a hardcopy print of her image from the hardcopy output device 60. Alternatively, the customer identification device and the output station display may be located separately from the hardcopy output device. For example the hardcopy output device may be a standalone unit 62 located behind a counter in a gift shop or hotel lobby where the customer would pick up her prints, and a customer identification device 64 may be located along with an output display 66 in an area accessible to the public. A stand alone hardcopy output device 62 may also be located at a remote location such as the terminal of a common carrier so that the hardcopy images may be shipped to any destination requested by the customer.

Billing of the customer for the service is handled by the Central image processor 50. Billing to the customer's credit card may be handled automatically by providing a credit card reader in the customer identification device 56 or 64. The customer ID input device 22 in the capture station 14 may include apparatus for issuing the customer a customer identification card bearing a unique ID code. The customer identification device 56 or 64 would then read the unique code on the identification card as the customer identification, and the system would generate the billing for that customer. The customer would use the identification card to pick up and pay for her images.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | high bandwidth communications network |
| 12 | network controller |
| 14 | image capture station |
| 16 | digital camera |
| 18 | customer identification device |
| 20 | communication controller |
| 22 | customer ID input device |
| 24 | control display |
| 26 | objective lens |
| 28 | solid state imager |
| 30 | shutter |
| 32 | flash lamp |
| 34 | A/D converter |
| 36 | buffer memory |
| 38 | microprocessor |
| 40 | timing generator |
| 42 | CCD driver |
| 44 | photometer |
| 46 | camera control module |
| 48 | non-volatile memory |
| 50 | central image processor |
| 52 | image editing work station |
| 54 | image output station |
| 56 | identification device |
| 58 | touchscreen CRT |
| 60 | hardcopy output device |
| 62 | stand alone hardcopy output device |
| 64 | customer identification device |
| 66 | output display |

What is claimed is:

1. A system for electronic photography, comprising:

a. a plurality of image capture stations, each station including a digital camera and a customer identification device for selectively actuating the digital camera, by the customer, to capture a digital image and recording customer identification with the digital image;

b. a central image processor for collecting and storing the digital images captured by the image capture stations;

c. a central controller;

d. a high bandwidth communications network connecting the image capture stations to the central controller, the central controller controlling access to the network;

e. an output station connected to the central image processor by the high bandwidth communications network, the output station including a customer identification device, a display device responsive to actuation of the customer identification device to display the digital images associated with the customer identification, and means for the customer to select images to be transferred to an output medium; and f. an output device connected to the central image processor by the high bandwidth communications network for transferring the digital images to the output medium.

2. The system claimed in claim 1, wherein the output device is a printer for printing the images.

3. The system claimed in claim 1, wherein the output device is a digital image storage device for transferring the digital images to a digital image storage medium.

4. The system claimed in claim 1, wherein the customer selection means is a touch screen CRT.

5. The system claimed in claim 1, wherein the customer identification device is a credit card reader, and the output station further includes a means for billing the customer's order to the customer's credit account.

6. The system claimed in claim 1, further comprising means for issuing each customer a customer identification card hearing a unique code, and wherein the customer identification device reads the unique code on the identification card as the customer identification.

7. The system claimed in claim 1, wherein the high bandwidth communications network is a fiber optic network.

8. The system claimed in claim 1, wherein the high bandwidth communications network is a radio frequency communications network.

9. The system claimed in claim 1, wherein the output device is located in the output station.

10. The system claimed in claim 1, wherein the central image processor contains stock images that may be viewed and selected by the customer at the output station.

11. The system claimed in claim 1, wherein [the] *at least one* image capture station is located at a mechanized attraction and *the camera of said image capture station* is automatically actuated by the mechanism of the attraction.

* * * * *